United States Patent Office 3,297,061
Patented Jan. 10, 1967

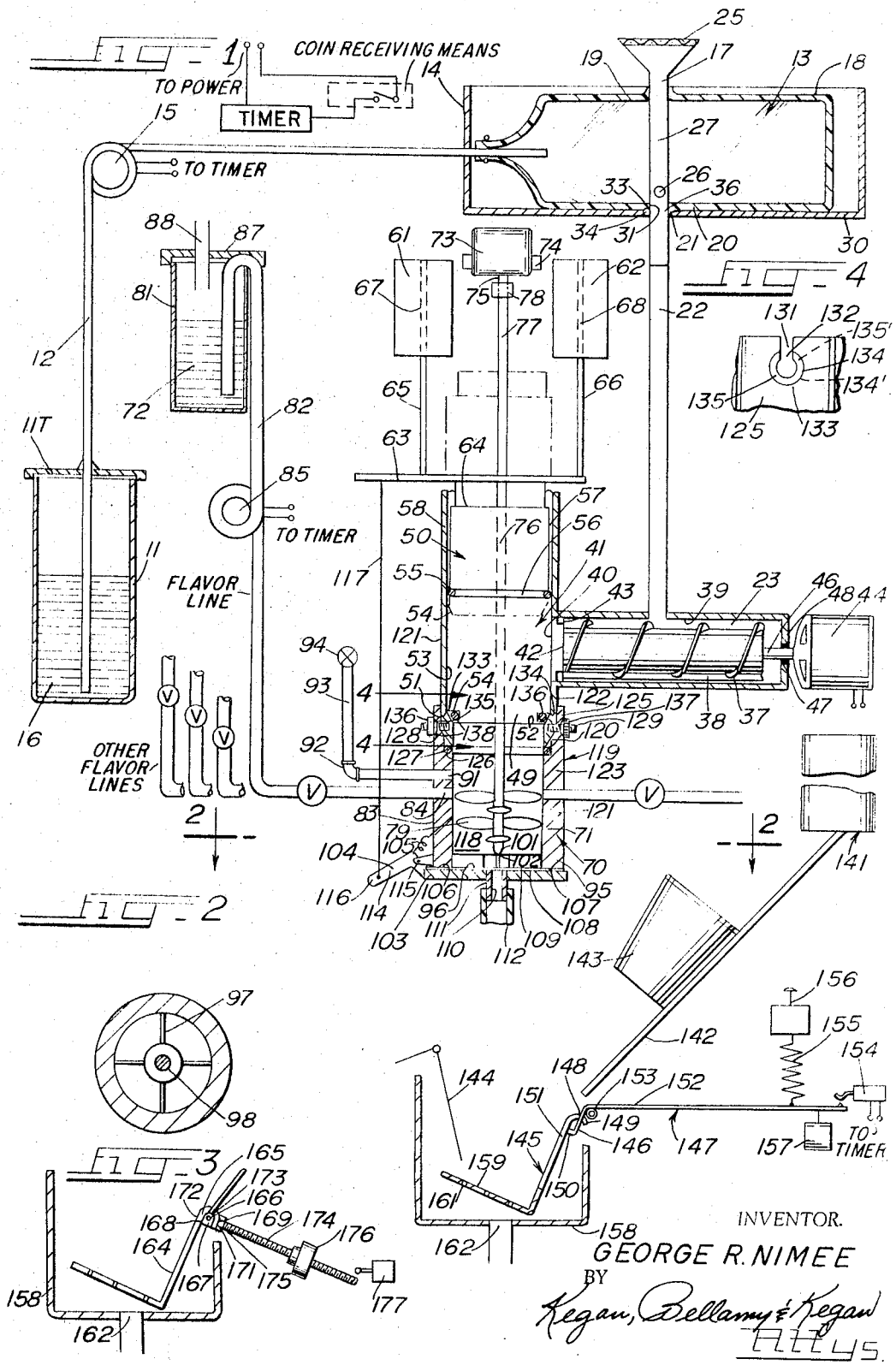

3,297,061
AUTOMATIC VENDING MACHINE
FOR COMESTIBLES
George R. Nimee, 104 W. Dakota St.,
Spring Valley, Ill. 61362
Filed Aug. 28, 1963, Ser. No. 305,080
17 Claims. (Cl. 141—9)

This invention relates to improvements in automatic vending machines for comestibles and has particular application to machines for dispensing measured quantities of milkshakes or soft ice cream.

More specifically, the invention is directed to an automatic vending machine which will dispense, upon selection, any of a plurality of flavors of a refrigerated milkshake or soft ice cream product in a predetermined controlled quantity.

Many types of food vending and dispensing machines are known in the prior art. Among these are milkshake and soft ice cream dispensers which will deliver a measured quantity of a product. An example of such a vending machine is that made by General Equipment Co. These machines include self-contained refrigerated reservoirs in which the mix is stored until delivery is called for. Coin-operated machines having automatic cup feeding and positioning features are also known. However, none of these machines has proven completely satisfactory, each having one or more undesirable or objectionable features or being inadequate or deficient in one or more respects. The present invention constitutes an advance in the field of automatic vending machines for comestibles such as milkshakes and soft ice cream. The novel features of the machine render it useful, as well, in the dispensing of other products such as flavored carbonated and uncarbonated beverages.

The aim of the present invention is to provide a machine which obviates many of the objectionable features of related prior art devices.

It is a principal object of the present invention to provide a machine which will deliver any of a plurality of flavors of a product from a single base product or base mix.

It is another important object of the present invention to provide, in a machine adapted for dispensing a refrigerated product, an improved means for reloading and servicing to prevent contamination and to ensure the maintenance of sterile and sanitary conditions in the machine as well as in the product being dispensed.

It is still another important object of the present invention to provide an improved method of introducing flavoring into a base product.

Other important objects are the following: to provide an improved product storage, conveyance, and delivery system; to provide a self-contained, unitary, disposable, dispensible product conduit and storage vessel; to provide an improved mechanism for measuring and controlling the quantity of product delivered; to provide a sensing system which obviates short-weight delivery and over-weight delivery; to provide an improved mixing chamber in which any selected one of a plurality of flavors may be combined with a base mix; to provide a combination of a time control and weight sensing means to insure full measure delivery irrespective of the viscosity or thickness, or density of the comestible being delivered, and to obviate overflow; to provide a food product dispensing machine having a flavor intermix chamber in which any selected one of a plurality of flavors is incorporated into a base product; to provide a system for washing the mixing chamber after each mixing operation in which the base product and the flavoring agent are combined; to provide a spring-held cycle-controlled and actuated closure member for closing the outlet port of the mixing chamber of the food product dispenser; to provide a machine for automatically mixing and dispensing any selected one of a plurality of flavored products and in which the blending chamber is readily and simply disassembled for periodic cleaning as may be necessary to ensure sanitation; to provide an improved agitator for blending flavoring with a base mix; and to provide an apparatus of the type described which is completely automatic and which is reliable and rapid in operation.

The foregoing and numerous other important objects, advantages, and inherent functions of the invention will become apparent as the same is more fully understood from the following description, which, taken in conjunction with the accompanying drawing, discloses a preferred embodiment of the invention.

Referring to the drawing:

FIGURE 1 is a schematic representation of the apparatus of the invention;

FIGURE 2 is a sectional view taken along the line 2—2 in FIGURE 1;

FIGURE 3 depicts a second embodiment of the weight-sensing device of the invention; and FIGURE 4 is a view taken along the line 4—4 in FIGURE 1 and showing features of the structure by which the removable dispensing head of the invention is fastened in position.

General description

The automatic dispensing apparatus of the invention is, in a preferred embodiment, a machine for automatically mixing and delivering different flavors of milkshakes or soft ice cream by the cup. The machine includes refrigeration equipment and refrigerated chambers to hold the products at proper storage temperatures until dispensed.

Many of the general features and elements which comprise parts of the over-all machine are conventional and well known in the prior art. These features and elements will be referred to from time to time but will not be described in any great detail since it is deemed that no such exhaustive treatment is necessary. For example, the machine in which the novel features of the present invention have been incorporated includes basic components such as refrigeration equipment, pumps, cup dispensing apparatus, a coin receiving and handling mechanism, and timing and programming electrical circuits.

A very important novel feature of the present invention is a sterile plastic expansion bag including its associated tubes and fittings. The bag itself is contained in a refrigerated top compartment of the machine. A lift tube extends from the bag into a refrigerated dairy-filled container in which the basic mix is stored, and the mix is moved from this storage container and delivered to the plastic bag by means of a peristaltic pump. An aerator tube connects the interior of the bag with the delivery tube to a freezing barrel or chamber in series with the mixing chamber and with the dispensing head in which the desired liquid flavor is incorporated into the base mix.

The sterile plastic expansion bag, and the aerating tube and the delivery tube connected to the bag comprise what may be considered a single service assembly which is readily removable and replaceable when a new dairy-filled container is installed. The problems associated with washing and cleaning equipment at the site of the installation are obviated and servicing of the vending equipment is greatly simplified and facilitated.

Several 5-gallon or 10-gallon cans of dairy-filled mix may be stored simultaneously in the refrigerated compartment provided in the cabinet of the vending machine. Separate lift pumps and delivery tubes are used for each storage can and the cans are assigned numbers in relation to first-in, first-out timers, thus ensuring that the older mix is the first to be used, thus guaranteeing freshness.

The separate delivery tubes may be connected to one another through a manifold or a series of yokes having check valves and controls operated through an electrical switch-over circuit.

Another important novel feature of the machine of the invention is the dispensing head or blending chamber in which the flavoring component selected is incorporated into the base mix. A solenoid-operated plug-type dispensing valve controls the entrance of the base mix from the freezing barrel into a mixing chamber and then into the dispensing head. Simultaneously, the selected flavoring syrup is introduced into the blending chamber. High-speed motor-energized mixing blades within the blending chamber and operative during admission of the base mix assist and facilitate delivery and ensure homogeneity of the milkshake or soft ice cream product delivered into the cup.

Still another feature which is related to both the operation of the blending chamber and the establishment and maintenance of sanitary conditions is the provision of means for cleaning the blending chamber subsequent to each delivery of product. Cleaning is achieved by flushing water through the chamber. The water is introduced automatically, under the control of timing mechanisms, in proper cycled sequence.

The automatic machine of the present invention is provided with dual interrelated and cooperating delivery control systems to ensure delivery of the exact weight of product irrespective of the viscosity of the material being handled. The first system may be described as a more or less conventional cam system or time-dependent system which provides an open valve time of sufficient duration to deliver an "over amount" of product even when the product is of high viscosity. In conjunction with the cam or timer system, there is provided a weight-sensitive and responsive control which determines the exact amount of material delivered. If the product handled is "thin," the weight sensing system will normally govern. If the product is "thick," the cam mechanism or time control mechanism will provide the control. Actuation of either system's limits will terminate delivery of product.

The practice of the present invention does not require any special base product or mix, and since the base product does not constitute an element of the invention, no detailed analysis of the well-known useful formulations is provided herein. As those skilled in the relevant art are aware, suitable bases may be obtained from commercial dairies who offer their own formulations or will custom-mix a particular product to meet the specifications set by a customer. Such mixes ordinarily comprise a milk base to which has been added bodying agents, sugars, emulsifiers and stabilizers. The cooled final product is adapted for aeration to provide what are commonly referred to and known as milkshakes, "frozen custards," "malts," and soft ice cream. The mix may include a flavoring material such as vanillin.

*Structure and operation*

Referring more particularly to the drawing which illustrates the invention, attention is directed, in particular, to FIGURE 1, where there is show a schematic representation of the automatic vending machine of the invention. A refrigerated base mix reservoir 11, which is preferably a 5-gallon or 10-gallon dairy-type container, and which has a closure or top 11T adapted to filter air entering the reservoir 11, retains the base mix and protects the contents of the reservoir from external airborne sources of contamination. A conduit or lift tube 12 projecting into the reservoir connects the reservoir 11 to a plastic expansion bag 13 supported in a refrigerated pan 14, and a pump 15, which is preferably of a peristaltic type, moves the base mix 16, which may be a milkshake base, a "frozen custard" base, or a soft ice cream base, and the like from the reservoir 11 through the lift tube 12 to the plastic bag 13.

The pump 15 which is of conventional design, as is well known in the relevant art, will not be described herein except to point out that it serves, without coming into contact with the mix 16, to propel the mix through the tubing to which the pump applies its characteristic progressive moving pressure. Two separate refrigeration systems are provided, both conventional, one to hold the base ingredients at a safe storage temperature and a second maintained at below freezing temperatures to make milkshakes and soft ice cream products. Milkshakes are ordinarily dispensed at about 27° F. Appropriate insulation is provided in accordance with approved engineering practice, and the system includes indicators and interlocks to preclude dispensing of a product which has not been kept at the proper storage temperature. The machine is engineered to comply with all Public Health Code requirements.

As indicated somewhat schematically in FIGURE 1, the expansion bag 13, into which the base mix 16 is pumped from the reservoir 11, serves as a component of the product aeration system. Aeration air is provided by carburetor means comprising an air inlet tube 17 sealed into the wall 18 of the expansion bag 13 at one side 19 and projecting through the bag and sealed into and through the opposite side 20 of the bag. The tube 17 extends beyond the bag to provide a connection 21 to a conduit 22 leading to a freezing chamber 23.

The air inlet tube 17 is connected near its input end to an air filter 25 through which all aeration air introduced into the base mix must pass. The filter 25 may consist of a cotton plug, a paper disc, or any other well-known medium effective to prevent the passage of airborne bacteria and other contaminants into the aerated base mix. The filter has low pressure drop characteristics so as not to impair the flow or feed of base mix from the expansion bag 13 into the freezing chamber 23.

An orifice 26 in the wall of the tube at the base of that portion 27 of the air inlet tube 17 which is within the expansion bag 13 provides a communication passage between the interior of the bag 13 and the interior of the conduit and aeration tube 22. As product demand is made upon the vending machine, base mix flows from the expansion bag 13 through the orifice 26 into the conduit tube 22 where air drawn into the tube 17 by aspiration mixes with the base mix to aerate the mix.

In a preferred embodiment of the invention, the expansion bag 13 lies in the refrigerated pan 14. The plastic material of which the bag 13 is fabricated follows the contours of the supporting pan 14 permitting the bag to mold to the cold surface of the refrigerated pan 14. Heat transfer between the contents of the bag 13 and the cold pan 14 is greatly facilitated.

As illustrated in FIGURE 1 the floor 30 of the pan 14 has an outlet 31 which leads directly to the freezing chamber 23 through a short conduit 22. The connection between the expansion bag 13 and the conduit 22 is achieved by inserting the discharge end 33 of the air inlet tube 17 into the pan outlet 31. An annular compression ring 34 encircling tube 17 near its end 33 effects a tight seal between the periphery of the tube portion 27 and the internal wall 36 of the pan outlet 31. When a new supply of mix is required, the plastic expansion bag 13 may be readily and easily removed from the refrigerated pan 14 together with the integral aeration tube. A new expansion bag 13 is then placed in the pan 14 and connected to the conduit 22 leading to the freezing chamber 23. At the same time, the new lift tube 12 is introduced into the replacement reservoir 11. The machine is thus restocked and is ready for renewed operation without any need to wash equipment and without danger of contaminating equipment components.

As indicated schematically in FIGURE 1, the base mix, having been aerated as it leaves the expansion bag 13 and passing through the conduit or aeration tube 22, next enters a freezing chamber 23 which is maintained at a temperature low enough (about 27° F.) to convert and to keep the aerated mix in a semi-solid state. The freezing chamber 23, which is conventional, is cylindrical in section and is provided with a motor-driven screw or auger 37 extending through the length of the chamber. A knife blade 38, rotated with the auger 37, traverses a circular path to pass in close proximity to the cylinder's surface 39 to remove frozen mix adhering thereto. At the same time the auger 37 propels the aerated frozen or semi-frozen mix toward the product discharge port 40 of the cylinder and into the mixing chamber 41. The auger and blade assembly is journaled and supported at the discharge end 42 of the cylinder in an annular sleeve bearing 43, and is rotated by means of an external motor 44 coupled to the end of an axial shaft 46 of the assembly journaled through a bushing 47 in the closed end wall 48 of the cylinder. The motor 44 is automatically energized when demand for product delivery is made upon the machine.

Energization of motor 44 is effected upon deposit of a coin in the COIN RECEIVING MEANS schematically shown in FIGURE 1 and forming part of the electric circuit energizing means also including a timer also schematically shown in this view.

As depicted schematically in FIGURE 1, the mixing chamber 41 of a preferred embodiment of the invention comprises a vertically disposed cylindrical cavity at the discharge end 42 of the freezing chamber 23 and in communication therewith. A close-fitting vertically slidable piston-like gate or plug 50 normally seats on an annular beveled shoulder or offset 51 formed at the lower edge 52 of a lower cylindrical portion 53 of the mixing chamber 41. The plug 50 is beveled 54 at its lower edge 52, and an annular groove 49 formed in the plug 50 just above the beveled end carries an O-ring which contacts the shoulder 51 of the mixing chamber to ensure an effective seal. In this the "off" position of the machine, the plug 50 blocks the opening 40 and prevents the aerated mix in the freezing chamber 23 from entering the mixing chamber 41. A second annular bearing ring 55 of a high-lubricity plastic such as Teflon or Kel-F set in a circumferential groove 56 in the plug 50 extends radially slightly beyond the wall 57 of the plug to bear against the cylindrical housing 58 of the plug 50 ensuring proper spacing between the wall 57 of the plug 50 and the cylindrical housing 58 and serving as a bearing and seal.

Aerated base mix from the freezing chamber 23 may enter the mixing chamber 41 only upon elevation of the plug 50 to clear the freezing chamber exit port 40. In a preferred embodiment of the present invention a pair of solenoids 61 and 62 supported above and to either side of the plug 50 are utilized as a plug-elevating means. A bar or yoke 63 fastened to the top 64 of the plug 50 and extending laterally to either side of the plug 50 is connected to the retractable magnetic iron cores 65 and 66 of the solenoids 61 and 62. Energization of solenoids 61 and 62 is effected upon deposit of a coin in the COIN RECEIVING MEANS and sensing means schematically illustrated in FIGURE 1 and forming a part of the electric circuit energizing means of the invention. Upon actuation of the solenoids 61 and 62 during the vend cycle, the cores of the energized solenoids retract into the solenoid bores 67 and 68 elevating the plug-connected bar 63 to lift the plug 50 to clear the port 40. The mechanism is more or less conventional and a single solenoid may be used if preferred. At the same time, the peristaltic pump 15, which is controlled by the Timer as indicated by the legend "To Timer" lifts base mix into the expansion bag 13, aerated mix is delivered into the freezing chamber 23, and the motor 44 drives the auger 37 to propel aerated mix from the freezing chamber 23 into the mixing chamber 41. If a neutral or vanilla-flavored milkshake or soft ice cream product has been selected no additions to the base mix are required and the product may be delivered, as will be more fully described hereinafter.

A very important and a novel feature of the invention is the provision for and the method of introducing any one of a plurality of selected flavors or flavoring ingredients into the base mix to provide a variety of flavored products. In accordance with the practice of the present invention, and as represented and illustrated schematically in FIGURE 1, the lower portion of the mixing chamber 41 constitutes a dispensing head 70 including a blending chamber 71 in which the aerated base mix is intimately combined with a selected flavoring ingredient 72 which is preferably a liquid or a semi-liquid fluid concentrate. A motor-driven high-speed stirrer is used to ensure homogneneity of the final product. In a preferred embodiment of the invention a stirrer motor 73 is mounted on a bracket 74 which supports the motor above the mixing chamber 41 in a position such that the driven motor shaft 75 is coaxial with the cylindrical cavity or chamber of the mixing chamber 41 and coaxial with the cylindrical blending chamber 71 therebelow. The vertically positionable plug 50 is provided with an axial bore 76 extending therethrough and having a diameter slightly greater than the diameter of a stirrer shaft 77 which is connected to the driven motor shaft 75 by a suitable coupling 78 and which extends through the bore 76, the bore 76 serving effectively as a guide or sleeve bearing for the shaft 77.

Blades 79 near the lower end of the stirrer shaft provide the necessary agitation and whip the flavoring component into the aerated base mix. The stirring action commences automatically upon actuation of the master relay (not shown) energized when the vending machine cycle is initiated by deposit of a coin in the coin receiving and sensing means. In a preferred embodiment of the invention the stirrer includes stacked multiple pairs of blades 79 and in the specific embodiment depicted four sets of blades are used. These sets are arranged on a shaft 75 one pair above the next, adjacent pairs being staggered about 90° from each other with respect to their annular disposition. The uppermost set or top set of blades 79T comprise scoop-like arms the ends of which are substantially straight to pass very close to the flavor entry port. The contour of the blades is such that flavoring material introduced through the port is drawn into the blending chamber 71 whereby mixing is facilitated. The other sets of blades agitate and mix the base product, distribute the flavoring agent therethrough, and drive the blended product downward for delivery.

From a consideration of the structure described, it is apparent that the stirrer shaft 77, which extends through the plug 50 is free of the plug. Actuation of the solenoids 61 and 62, while causing elevation of the yoke 63 and plug 50 has no effect upon the shaft 77 which remains fixed in position, though freely rotatable.

The flavoring ingredients 72 are each stored in separate containers 81, each container having a tube or conduit 82 for delivery of material to the blending chamber 71 and provided with a valve comprising flavor selecting means. The wall 83 of the dispensing head 70 has a plurality of bores or ports 84 therethrough which constitute openings through which selected flavoring ingredients are introduced into the blending chamber 71. As indicated in FIGURE 1, the ports 84 are preferably located so as to deliver the syrups or flavors into the blending chamber 71 at a position very slightly above the top of the blades 79 or opposite the top pair of blades 79T. Connections between the ports 84 and the tubes 82 are made by means of suitable fittings external of the wall 83 and in communication with the ports 84 extending through the wall 83 of the dispensing head 70.

Preferably, the syrups or other flavoring ingredients 72 are delivered to and are injected into the blending cavity 71 by peristaltic pumps 85, which are controlled by the Timer as indicated by the legend "To Timer." Alternatively, air pressure and solenoid-operated pinch valves may be used. The containers 81 are provided with appropriate top closures 87 and intake leads 88. Since the several containers 81 and the corresponding pumps 85 for storing and dispensing the flavoring ingredients are of the same construction, in the interest of avoiding unnecessary and possibly confusing repetitive structures in the drawing, only one container 81 and one corresponding pump 85 are illustrated. The several flavoring delivery lines 82 and their corresponding control valves are indicated schematically. Syrup injection is effected by pumping (pump 85) any selected flavoring ingredient 72 during the vend cycle, the duration of the pump operation itself being controlled by appropriate cams (not shown) on the master timer mechanism which governs the over-all sequential operation of the machine. Actuation of any given pump 85, upon the selection of a particular flavor, causes the pump to operate and to remain in operation for a finite predetermined time controlled by settings on the cams of the master timer. During the flavor delivery period, the peristaltic pump forces syrup through the tube 82 and port 84 and into the blending chamber 71. The master timer mechanism, which is indicated schematically as the Timer in FIGURE 1, may be of any preferred type well known to those skilled in the vending machine art. Since the timer itself forms no part of the present invention, no specific structure for the particular timer used is shown herein. The timer includes the usual cam assembly, gearing or linkage, and drive means. The timing cams are set to terminate syrup injection or delivery just before the end of the product delivery cycle so that flavored mix will not remain in the blending chamber 71 to blend with and to "contaminate" the next flavored product selected.

Electrical timers and cycle sequence controls of the type used in the basic automatic vending machine in which the present inventions are incorporated are well known in the art and it is therefore deemed unnecessary to describe themi n any great detail herein. Controls such as those used in vending machines of the General Equipment Co. type are suitable for and are useful in the practice of the present invention. The product vending apparatus is fully automatic in operation, requiring merely the insertion of a coin to initiate operation and the removal of the filled cup at the completion of the operation cycle. All of the intermediate steps are performed, in sequence, fully automatically.

An important feature of the present invention is the provision of means for flushing or rinsing the blending chamber 71 with water at the conclusion of each vend cycle. This rinse step is very important not only for helping to maintain the requisite cleanliness within the chamber but also for preventing undesirable cross transfer of flavors from one selection to the next following. A water inlet bore 91 extending through the wall 83 of the blending chamber 71 and located above the stirrer blades 79 is provided with an external fitting 92 to which a water supply hose 93, leading from a water supply source (not shown), is connected. A control valve 94, normally closed and preferably of the solenoid type, is provided to control and regulate the flow of water through the hose 93 and into the blending chamber 71. The wash water is conveniently supplied at line pressure through a conventional pipe and connection. Flow is regulated by means of the solenoid valve 94 which is in turn controlled by one of the cams (not shown) of the program timer. The initiation of the water flow and the control of its duration are both set into and regulated by the master cycle control or timer of the machine. In the normal sequence of operations the arrangement of control cams in the timer is such that the rinsing step will take place only after the full measure of product has been delivered.

Delivery of the product itself is also controlled through cams in the timer. As hereinafter more completely set forth, a weight sensing switch may be relied upon to cut off product delivery. In all cases, whether through time control or weight sensing, product delivery is stopped by cutting off the current to the vend solenoids 61 and 62 causing the plug 50 to fall to block the port 40 of the freezing chamber 23. At the same time the auger drive motor 44 and the stirrer motor 73 are stopped by action of the timer cams or through the weight-sensing switch, both control means being operative to cut off current to the motors.

In the lower or discharge end 95 of the blending chamber or dispensing head 71 is a port 96 through which the base product or the flavor-blended product is delivered. As best seen in FIGURE 2, the opening is interrupted by several relatively narrow vertically extending vanes or dividers 97 which help to control the turbulence produced by the high speed stirring blades 79. Mixing is enhanced and smooth outflow of product is facilitated. While four vanes are shown, a greater or a lesser number may be used. In addition to their function described above, the vanes serve also as a support for a stirrer shaft end guide bearing 98. During the product vending cycle, the plug 50 is in a raised position leaving a relatively long length of the stirrer shaft 77 exposed therebeneath. In a preferred embodiment of the invention, the stirrer shaft 77 is provided with a longitudinal coaxial extension 101 projecting downwardly from the blades 79 and terminating in a bearing point 102 which seats in the end guide bearing 98 providing improved radial stability for the stirrer shaft and obviating whipping and wear and to minimize undesirable vibrations.

Attached at the lower end 95 of the blending chamber 71 is a cover 103 for sealing the product delivery port 96 and for obviating contamination of the chamber. In the particular illustrative embodiment of the invention depicted, the cover 103 pivots on a hinge 104 and is normally biased to a closed position by means of a spring 105. The bottom planar surface 106 of the lower end 95 of the dispensing head 70 is formed to provide an annular ridge or bead 107 and the facing side 108 of the cover 103 is surfaced with a suitable soft gasket 109 ensuring an effective seal between the cover 103 and the bead 107. The cover itself includes a drain port 110 extending through the center of the cover and communicating with a nipple 111 on the outside of the cover 103. A tube 112 connected to the drain port 110 of the cover by means of the nipple 111 conducts the waste water of the rinsing step to a waste tank (not shown) in a refrigerated compartment.

Fastened to the cover 103 at a point near the hinge 104 is an arm 114 extending outwardly and downwardly from the hinge in a plane transverse the axis defined by the hinge pin 115. At its free end 116, the arm 114 is, in turn, connected to a rod, chain, or cable 117 fastened to and depending from the yoke 63 associated with the plug 50 and with the solenoids 61 and 62. Upon actuation of the solenoids 61 and 62 during the vending cycle, the upwardly carried yoke 63 pulls the cable 117 to lift the arm 114 thereby pivotally to open the cover 103 about the hingepin 115 as a fulcrum. Upon completion of the vending cycle and prior to the influx of rinse water into the blending chamber 71 of the dispening head 70, the timer controls deactivate the solenoids 61 and 62. The gate plug 50 drops to its seating position on the shoulder 51 at the bottom of the mixing chamber 41 blocking the discharge port 40 of the freezing chamber 23, and the cover 103 swings to close the product delivery port 96 of the blending chamber 71.

In order to maintain a high degree of cleanliness to ensure utmost sanitation for the vending machine, it is desirable, periodically, to wash intensively the blending chamber 71, the product-delivery port 96, the vanes 97, the cover 103, and the areas adjacent the inlet ports 84 through which flavoring ingredients are introduced into the blending chamber. To effectuate this end and to simplify the procedural steps required, in a preferred embodiment of the invention, the dispensing head 70 is removably rather than permanently attached to the bottom portion 118 of the structure which defines the mixing chamber 41. In the schematic illustrative example shown in FIGURE 1, the dispensing head 70 is attached, as an external sleeve 119 fastened to the supporting lower end 118 of the cylindrical mixing chamber 41. The bottom end outer surface 120 of the annular wall 121 of the mixing chamber 41 is preferably beveled downwardly and inwardly of the surface 122 of the vertically extending wall of the chamber 41. The interior of the upper portion of the annular wall 123 of the dispensing head 70 is machined to provide the externally mating sleeve 119 having a vertical wall portion 125 and an offset or shoulder 126 which supports an O-ring 127 ensuring an effective seal between the mixing chamber 41 and the dispensing head 70.

The dispensing head 70 is removably attached to the lower end 118 of mixing chamber 41. Although attachment may be achieved by any suitable means, in a preferred embodiment of the invention the lower portion 118 of the mixing chamber 41 is provided with a pair of fixed threaded stud bolts 128 and 129 extending laterally outwardly from diametrically opposed wall portions of the chamber 41. The annular sleeve 119 of the cooperating dispensing head 70 includes a pair of bolt-receiving slots 131 and 132 opening upwardly on opposed sides and extending through the annular wall 123 of the dispensing head 70. At the lower closed end portions 133 of each of the slots the outer surface of the annular wall 123 is beveled to provide slotted collars 134 and 134' having inwardly converging outside walls 135 and 135'. A pair of knurled nuts 136 and 137, tapped for attachment to the stud bolts 128 and 129, are beveled at their forward ends to form angled surfaces 138 and 138' to seat against the correspondingly tapered surfaces of the collars 134 and 134'. When the blending chamber 70 is slidably positioned onto the mixing chamber 41 and the bolts 128 and 129 are located in the slots 131 and 132, tightening of the nuts 136 and 137 causes a slight lifting of the dispensing head 70 to compress the O-ring 127 between the offset 126 of the sleeve 119 and the beveled end surface 120 of the mixing chamber 41 to effectuate a positive seal.

The automatic vending machine of the invention is provided with a cup feeding device 141 of a commercial type. For example, a cup feeder corresponding to that manufactured by the ABT Company is suitable. The cup feeder itself does not constitute one of the novel elements of the present invention, and such mechanisms being well-known and fully described in the prior art, no detailed description will be present herein. For the purposes of the present disclosure and as indicated schematically in the lower portion of FIGURE 1, it suffices to point out that the cup feeding device includes the usual slide or cup delivery chute 142.

As has been previously explained, a very important feature of the present invention is the provision of a weight sensing mechanism as a control to ensure full measure delivery while at the same time obviating overflow and associated waste when a highly fluid product is dispensed.

Referring now to the lower portion of FIGURE 1, upon initiation of the vending cycle, a cup 143 is released from the cup feeding device 141 and slides down a cup delivery chute 142. Near the end of its downward path, the cup 143 hits a swing stop 144 whereupon the cup 143 assumes a substantially upright position and finally comes to rest at a slight tile in a saddle 145 below the product dispensing head 70. The saddle 145 hangs on an arm 146 of a switch lever 147. In the embodiment of the cup switch assembly depicted, the arm 146 has a slot 148 through which the upper edge 149 of the saddle is hooked for support. The laterally extending base 150 of the L-shaped saddle support arm 146 bears against the side wall 151 of the saddle 145 and holds the saddle in a tilted position. The switch lever 147 has a horizontally extending switch-actuating arm 152 joined to the L-shaped support arm 146 at a pivot pin 153, and contacting a microswitch 154. A spring 155, adjustable for tension by means of a screw 156, supports the switch-actuating arm near that end of the arm removed from the pivot pin 153 which pin acts as a fulcrum. Adjustable counter weights 157, which are positionable along the switch-actuating arm 152, oppose the forces of the supporting spring 155, the spring 155 and the weights 157 constituting means for setting the value of the critical weight which must be impressed upon the saddle 145 before the microswitch switch 154 is actuated to cut off product delivery. As indicated schematically in FIGURE 1, upon actuation by the arm 152 of the weight-responsive lever 147, the microswitch 154, which is connected to "To Timer," overrides the cam-operated time-controlled delivery of the product and of the flavoring agent as well, the flavor pump 85 being shown also as connected "To Timer."

Upon energization of the vending machine, a cup 143 is released to slide down the chute 142 and into the saddle 145. The delivery port cover 103 pivots to expose the product delivery port 96 and the selected product flows into the cup 143. As the cup fills, its increase in weight causes the saddle to level pivoting the switch lever arm 147 about its pivot pin 153 causing the switch actuating arm 152 to actuate the microswitch 154 to stop product delivery. The saddle 145 comes to rest on a pan 158 from which position the filled cup is readily removed. The base or seat 159 of the saddle 145 is fabricated with holes 161 which preclude buildup of spillover product which might otherwise affect the weight balance. The saddle 145 is easily lifted out of engagement with the switch lever assembly 147 to facilitate cleaning. As indicated in the lower portion of FIGURE 1, a drain 162 in the bottom of the pan 158 leads to a refrigerated waste container.

An alternative embodiment of the weight-sensing and responsive structure of the invention is depicted in FIGURE 3 which shows a cup receiving saddle 164 pivotally mounted at its upper edge 165 over a horizontally extending support and pivot pin 166, the upper edge 165 of the saddle defining an inverted U-shaped open-ended slot 167. Each of the walls 168 and 169 defining the U-shaped slot has a threaded opening 171 and 172 extending therethrough at a position just below the pivot pin 166. The pin 166 is grooved 173 at its lower surface in a direction transverse its principal axis and in alignment with the openings 171 and 172 in the walls 168 and 169 defining the U-shaped slot 167 and a threaded rod 174 extending through the openings 171 and 172 and lying in the groove 173 of the pin 166 serves as a lever arm and switch actuating arm. A lock nut 175 holds the rod 174 fixed in position and an adjustably positionable counterweight 176 threaded on the rod 174 serves as means to set the value of the critical weight to which the system will respond. Upon the combined weight of the saddle 164, the cup, and its contents reaching this critical weight, the lever arm will pivot about the pin 166 as a fulcrum and will move upwardly to contact a solenoid switch 177 to cut off product delivery.

It is believed that the invention and its numerous attendant advantages will be fully understood from the foregoing description, and it is obvious that numerous changes may be made in the form, construction and arrangement of the several parts without departing from the spirit and scope of the invention, or sacrificing any of its attendant advantages, the form herein disclosed being a preferred embodiment for the purpose of illustrating the invention.

What is claimed is:
1. An automatic vending machine for selectively dispensing frozen and flavored comestibles in predetermined measured quantities,
    said machine comprising
    a reservoir for storage of a refrigerated supply of a
        fluid comestible base mix, a base mix aerating chamber,
conduit means connecting said reservoir and said aerating chamber,
pumping means for moving said base mix from said reservoir through said conduit means and into said aerating chamber,
air injection means for incorporating filtered air throughout said base mix,
air filter means for filtering air used in aerating said base mix,
dispensing means for providing a controlled amount of a selected flavoring agent for incorporation in said aerated base mix,
a blending chamber in which said flavoring agent is mixed into said aerated base mix,
said chamber having a first port for entry of base mix thereto, a second port for discharge of blended product therefrom, and a third port for introduction of rinse water thereto,
valve means for controlling delivery of said aerated base mix through said first port into said blending chamber,
closure means for said second port of said blending chamber,
conduit means for delivery of said flavoring agent into said blending chamber,
mixing means for blending said aerated base mix with said flavoring agent in said blending chamber to provide a homogeneous flavor-blended product,
cup dispensing and delivery means for positioning a cup to receive a controlled and measured quantity of said blended product from said blending chamber,
weight sensing and responsive means contacting said cup and responsive to a predetermined critical minimum weight of blended product delivered thereto to actuate said closure means and valve means to close said first and said second ports of said blending chamber to terminate delivery of said blended product to said cup and to terminate delivery of said aerated base mix and of said flavoring agent to said blending chamber,
water supply and discharge means for introducing said rinse water into said blending chamber for cleansing said blending chamber after each blending operation and for discharging said rinse water to waste, and
timer means for controlling and regulating programmed sequential operation of interacting and cooperating components of said machine.

2. An automatic vending machine for selectively dispensing any of a plurality of flavored comestibles in predetermined measured quantities,
said machine comprising
a reservoir for storage of a fluid comestible base product,
a base product and flavoring agent blending chamber,
pump means for delivering said base product into said blending chamber,
dispensing means for delivering a controlled amount of a flavoring agent to said blending chamber,
mixing means for blending said base product and said flavoring agent in said blending chamber to provide a homogeneous flavor-blended product,
cup dispensing and delivery means for positioning a cup to receive a controlled and measured quantity of said flavor-blended product from said blending chamber,
weight sensing and responsive means contacting said cup and responsive to a predetermined critical minimum weight of blended product delivered thereto to actuate controls effective to terminate delivery of said base product and of said flavoring agent to said blending chamber
water supply and discharge means subsequently operable for introducing rinsing solution into said blending chamber for cleansing said chamber after each blending operation and for discharging said rinsing solution to waste,
electrical circuit energizing means for actuating said machine to carry out its prescribed cycle of operation, and
timer means for controlling and regulating programmed sequential operation of interacting and cooperating components of said machine.

3. The machine as defined in claim 1 wherein said base mix aerating chamber and said conduit means connecting said reservoir and said aerating chamber comprise a disposable assembly.

4. The machine as defined in claim 1 wherein the aerating chamber comprises a unitary disposable and expandable plastic bag and tube adapted for disposal, said bag and tube being readily replaceable when said reservoir is depleted of base mix and is removed and replaced with a filled reservoir of said base mix to recharge said machine for continued operation.

5. An automatic vending machine for dispensing comestibles and comprising
a reservoir for the storage of a fluid comestible base mix,
a gravity feed container for receiving base mix from said reservoir,
pump and conduit means for delivering said base mix into said gravity feed container,
a refrigerated freezing barrel for receiving said base mix from said container and for cooling said base mix,
conduit means for delivering said base mix from said feed container to said freezing barrel,
aspirator type aeration means for aerating said base mixe as it moves from said feed container to said freezing barrel,
cup delivery and placing means for positioning a cup to receive a comestible dispensed by said machine,
coin receiving and handling means,
electrical timer and programming means for defining and controling sequential operation of components of said machine,
mechanical and automatic product flavoring means for incorporating a flavoring agent into said base mix to provide a flavored comestible,
and weight sensing means responsive to the delivery of a predetermined critical weight of said comestible into said cup to actuate controls to terminate delivery of said comestible.

6. An automatic vending machine for dispensing comestibles and comprising
a reservoir for the storage of a fluid comestible base mix,
a gravity feed container for receiving base mix from said reservoir,
pump and conduit means for delivering said base mix into said gravity feed container,
a refrigerated freezing barrel for receiving said base mix from said container and for cooling said base mix,
conduit means for delivering said base mix from said feed container to said freezing barrel,
aspirator type aeration means for aerating said base mix as it moves from said feed container to said freezing barrel,
cup delivery and placing means for positioning a cup to receive a comestible dispensed by said machine,
coin receiving and handling means,
electrical timer and programming means for defining and controlling sequential operation of components of said machine,
mechanical and automatic product flavoring means for incorporating a flavoring agent into said base mix to provide a flavored comestible,
said product flavoring means comprising a plurality of flavor concentrates and containers therefor, and mechanical means propelling said flavor concentrates from said containers for delivery into said base mix, a blending chamber into which said flavor concentrates are delivered whereby a selected flavoring agent is incorporated into and dispersed throughout said base mix, conduit means and metering means for delivery of a controlled quantity of said selected flavoring agent to said blending chamber for combining with said base mix, and blending means within said blending chamber for distributing said flavoring agent throughout said base mix, said blending means comprising a high-speed mechanical agitator positioned within said blending chamber.

7. An automatic vending machine for dispensing comestibles and comprising a reservoir for the storage of a fluid comestible base mix, a gravity feed container for receiving base mix from said reservoir, pump and conduit means for delivering said base mix into said gravity feed container, a refrigerated freezing barrel for receiving said base mix from said container and for cooling said base mix, conduit means for delivering said base mix from said feed container to said freezing barrel, aspirator type aeration means for aerating said base mix as it moves from said feed container to said freezing barrel, cup delivery and placing means for positioning a cup to receive a comestible dispensed by said machine, coin receiving and handling means, electrical timer and programming means for defining and controlling sequential operation of components of said machine, mechanical and automatic product flavoring means for incorporating a controlled quantity of a flavoring agent into said base mix to provide a flavored comestible, said product flavoring means comprising a plurality of flavor concentrates and containers therefor, and mechanical means propelling said flavor concentrates from said containers for delivery into said base mix, a blending chamber into which said flavor concentrates are delivered whereby a selected flavoring agent is incorporated into and dispersed throughout said base mix, conduit means and metering means for delivery of a controlled quantity of said selected flavoring agent to said blending chamber for combining with said base mix, blending means within said blending chamber for distributing said flavoring agent throughout said base mix, said blending means comprising a high-speed mechanical agitator positioned within said blending chamber, and weight sensing means responsive to the delivery of a predetermined critical weight of said comestible into said cup to actuate controls effective to cut off delivery of said comestible.

8. An automatic vending machine for dispensing comestibles and comprising a reservoir for the storage of a fluid comestible base mix, a gravity feed container for receiving base mix from said reservoir, pump and conduit means for delivering said base mix into said gravity feed container, a refrigerated freezing barrel for receiving said base mix from said container and for cooling said base mix, conduit means for delivering said base mix from said feed container to said freezing barrel, aspirator type aeration means for aerating said base mix as it moves from said feed container to said freezing barrel, cup delivery and placing means for positioning a cup to receive a comestible dispensed by said machine, coin receiving and handling means, electrical timer and programming means for defining and controlling sequential operation of components of said machine, mechanical and automatic product flavoring means for incorporating a controlled quantity of a flavoring agent into said base mix to provide a flavored comestible, said product flavoring means comprising a plurality of flavor concentrates and containers therefor, and mechanical means propelling said flavor concentrates from said containers for delivery into said base mix, a blending chamber into which said flavor concentrates are delivered whereby a selected flavoring agent is incorporated into and dispersed throughout said base mix, conduit means and metering means for delivery of a controlled quantity of said selected flavoring agent to said blending chamber for combining with said base mix, blending means within said blending chamber for distributing said flavoring agent throughout said base mix, said blending means comprising a high-speed mechanical agitator positioned within said blending chamber, weight sensing and responsive means responsive to the delivery of a predetermined critical weight of said comestible into said cup to actuate controls effective to cut off delivery of said comestible, said weight sensing and responsive means comprising a saddle into which said cup is received, a pivotally mounted lever arm supporting said cup-receiving saddle, weight counterbalance means carried on said lever arm for balancing a predetermined load comprising the combined weight of said saddle, said cup, and comestible product to be delivered into said cup, and switch means responsive to pivotal movement of said lever to terminate delivery of comestible product into said cup when said combined weight of said saddle said cup and said comestible product delivered thereinto exceeds said predetermined load.

9. An automatic vending machine for dispensing comestibles and comprising a reservoir for the storage of a fluid comestible base mix, a gravity feed container for receiving base mix from said reservoir, pump and conduit means for delivering said base mix into said gravity feed container, a refrigerated freezing barrel for receiving said base mix from said container and for cooling said base mix, conduit means for delivering said base mix from said feed container to said freezing barrel, aspirator type aeration means for aerating said base mix as it moves from said feed container to said freezing barrel, cup delivery and placing means for positioning a cup to receive a comestible dispensed by said machine, coin receiving and handling means, electrical timer and programming means for defining and controlling sequential operation of components of said machine, mechanical and automatic product flavoring means for incorporating a controlled quantity of a flavoring agent into said base mix to provide a flavored comestible, said product flavoring means comprising a plurality of flavor concentrates and containers therefor, and mechanical means propelling said flavor concentrates from said containers for delivery into said base mix, a blending chamber into which said flavor concentrates are delivered whereby said selected flavoring agent is incorporated into and dispersed throughout said base mix, conduit means and metering means for delivery of a controlled quantity of said selected flavoring agent to said blending chamber for combining with said base mix, blending means within said blending chamber for distributing said flavoring agent throughout said base mix, said blending means comprising a high-speed mechanical agitator positioned within said blending chamber, weight sensing and responsive means responsive to the delivery of a predetermined critical weight of said comestible into said cup to actuate controls effective to cut off delivery of said comestible, said weight sensing and responsive means comprising a saddle into which said cup is received, a pivotally mounted lever arm supporting said cup-receiving saddle, weight counterbalance means carried on said lever arm for balancing a predetermined load comprising the combined weight of said saddle, said cup, and comestible product to be delivered into said cup, switch means responsive to pivotal movement of said lever to terminate delivery of comestible product into said cup when said combined weight of said saddle said cup and said comestible product delivered thereinto exceeds said predetermined load, and water supply means and valve and port means for introducing water into said blending chamber subsequent to termination of delivery of said comestible product therefrom to rinse said blending chamber to remove any product remaining therein, and discharge port and conduit means for conveying rinse water from said blending chamber to waste.

10. An automatic vending machine for dispensing comestibles and comprising a reservoir for the storage of a fluid comestible base mix, a refrigerated freezing barrel for receiving said base mix from said reservoir, means for conveying said base mix from said reservoir to said freezing barrel, an expendable single-service type base mix storage and aerating container comprising a plastic-walled bag having an inlet port through a wall thereof for delivery of said base mix from said reservoir into said bag, conduit means connecting the interior of said reservoir with said inlet port of said bag, a plastic aeration tube open at each end and sealed into and through first and second spaced areas of said wall of said bag, said tube having an opening therein in the wall thereof and within said bag providing communication between the interior of said bag and the interior of said tube, one end of said aeration tube comprising an air inlet for ingress of aeration air into said tube and the other end of the tube comprising an outlet for discharge of aerated mix to said freezing barrel, said opening in said tube constituting an exit port for the discharge of base mix from said bag for delivery into said freezing barrel, whereby flow of base mix from said bag through said wall opening of said aeration tube aspirates air into said mix through said tube to aerate said base mix, cup delivery and placing means for positioning a cup to receive said semi-frozen aerated comestible, and electrical timer and programming means for defining and controlling sequential operation of components of said machine.

11. The automatic vending machine of claim 6, wherein said blending means further comprises a driven vertical shaft, multiple pairs of blades carried by and extending laterally outwardly from said shaft, said pairs of blades being spaced vertically from each other on said shaft and including a pair of scoop-like substantially flat-ended blades effective to sweep said flavoring agent into said mix for substantially uniform distribution therethrough.

12. The method of selectively dispensing any of a plurality of flavored products
    which method comprises
    cooling a base mix to provide a refrigerated product,
    aspirating air into said refrigerated product to provide an aerated refrigerated product,
    delivering said aerated refrigerated product into a blending chamber,
    feeding a controlled quantity of a flavoring agent into said blending chamber for incorporation in said aerated product,
    adding said flavoring agent to said aerated product and distributing said flavoring agent substantially uniformly throughout said aerated product to provide a flavored comestible,
    dispensing said flavored comestible for delivery into a receptacle provided therefor,
    and terminating delivery of said flavored comestible into said receptacle upon delivery of a predetermined quantity thereto.

13. The method of selectively dispensing any of a plurality of flavored products
    which method comprises
    cooling a base mix to provide a refrigerated product,
    aspirating air into said refrigerated product to provide an aerated refrigerated product,
    delivering said aerated refrigerated product into a blending chamber,
    feeding a controlled quantity of a flavoring agent into said blending chamber for incorporation in said aerated product,
    adding said flavoring agent to said aerated product and distributing said flavoring agent substantially uniformly throughout said aerated product to provide a flavored comestible,
    dispensing said flavored comestible for delivery into a receptacle provided therefor,
    sensing the weight of flavored comestible received in said receptacle, and
    terminating delivery of said flavored comestible upon delivery of a predetermined weight of said comestible into said receptacle.

14. The automatic vending machine of claim 6 wherein said blending chamber comprises a dispensing head removably secured for ready detachment from said machine to facilitate simple and effective servicing and cleansing of said blending chamber.

15. In an automatic vending machine the combination with a reservoir for storage of a fluid comestible base mix, and refrigerator means for cooling said base mix, of apparatus for dispensing a flavored comestible in predetermined measured quantities, said apparatus comprising:
    dispensing means for providing a controlled amount of a selected flavoring agent for incorporation in said base mix,
    a blending chamber in which said flavoring agent is mixed into said base mix,
    valve means for controlling delivery of said base mix into said blending chamber,
    conduit means for delivery of said flavoring agent into said blending chamber,
    mixing means for blending said base mix with said flavoring agent in said blending chamber to provide a homogeneous flavor-blended product, cup delivery and placing means for positioning a cup to receive said blended product from said blending chamber, porting means in a wall of said blending chamber for delivery of said blended product to a cup supported therebelow, and control means responsive to delivery of a predetermined weight of blended product to said cup to terminate said delivery of said blended product.

16. A machine as claimed in claim 2 wherein said reservoir for storage of said fluid comestible base product comprises a disposable plastic bag.

17. A machine as claimed in claim 2 wherein said dispensing means for delivering a flavoring agent to said blending chamber comprises a flavoring agent storage container, and conduit means connecting said container to said blending chamber.

References Cited by the Examiner

UNITED STATES PATENTS

| | | | |
|---|---|---|---|
| 2,995,158 | 4/1961 | Oberg | 141—82 X |
| 3,029,613 | 4/1962 | Lande | 62—303 |
| 3,075,480 | 1/1963 | Berg | 107—1 |

WALTER A. SCHEEL, *Primary Examiner.*

J. SHEA, *Assistant Examiner.*